United States Patent [19]

Wan et al.

[11] Patent Number: 4,738,947

[45] Date of Patent: Apr. 19, 1988

[54] THREE-WAY CATALYSTS OF IMPROVED EFFICIENCY

[75] Inventors: Chung-Zong Wan, Somerset; Joseph C. Dettling, Howell, both of N.J.

[73] Assignee: Engelhard Corporation, Menlo Park, N.J.

[21] Appl. No.: 772,296

[22] Filed: Sep. 4, 1985

Related U.S. Application Data

[63] Continuation-in-part of Ser. No. 696,947, Dec. 31, 1985, abandoned, which is a continuation-in-part of Ser. No. 620,415, Jun. 14, 1984, abandoned.

[51] Int. Cl.$^4$ .......................... B01J 21/04; B01J 23/10; B01J 23/42; B01J 23/89
[52] U.S. Cl. .................................. 502/304; 423/213.5
[58] Field of Search ...................... 502/304; 423/213.5

[56] References Cited

U.S. PATENT DOCUMENTS

| | | | |
|---|---|---|---|
| 3,993,572 | 11/1976 | Hindin et al. | 502/304 |
| 4,157,316 | 6/1979 | Thompson et al. | 502/304 |
| 4,448,895 | 5/1984 | Ono et al. | 502/304 |
| 4,492,769 | 1/1985 | Blanchard et al. | 502/304 X |

*Primary Examiner*—Wm. J. Shine

[57] ABSTRACT

A three-way catalyst of improved efficiency suitable for simultaneously oxidizing both gaseous hydrocarbons and carbon monoxide, while reducing nitrogen oxides is disclosed. The three-way catalyst includes alumina, a platinum group metal and a rare earth metal oxide having deposited thereon in intimate contact therewith a p-type metal oxide.

17 Claims, No Drawings

THREE-WAY CATALYSTS OF IMPROVED EFFICIENCY

This application is a continuation-in-part of copending application Ser. No. 696,947 filed Dec. 31, 1985, now abandoned, which is a continuation-in-part of copending application Ser. No. 620,415 filed June 14, 1984, now abandoned, incorporated herein by reference.

The present invention relates, in general, to improved catalytic compositions for controlling gaseous contaminants from the combustion of carbonaceous fuels and, in particular, to three-way catalysts having improved ability to convert unburned hydrocarbons, carbon monoxide and nitrogen oxides to less harmful forms in the presence of excess oxygen.

It is well known that when carbonaceous fuels are burned by conventional processes to produce powder, for example, in reciprocating piston engines, rotary engines, turbines, and the like, combustion is generally incomplete. The exhaust gases from these power producing system contain a mixture of by-product pollutants, including carbon monoxide, hydrocarbons (saturated and unsaturated) and oxides of nitrogen (often referred to as $NO_X$). Venting such exhaust gases to the atmosphere creates a serious air polution problem. Elimination or substantial reduction of these undesirable by-products is thus extremely desirable.

The problem of substantially converting gaseous contaminants or pollutants in the exhaust gases of power producing systems to less harmful forms has been the subject of much research activity, especially in recent years. There are three principal gaseous pollutants which are of current interest, namely, unburned hydrocarbons, carbon monoxide and nitrogen oxides. Standards for all these components have been set by the various governments which new automobiles are now required to meet. Until recently, adjustments to engine operating conditions have been sufficient to meet the standards. As these standards have become increasingly severe, it has been necessary to introduce new methods for removing or reducing the level of contaminants in the exhaust stream. Most recently, catalysts have been used to oxidize the unburned hydrocarbons and carbon monoxide. Removal of nitrogen oxides is accomplished by reducing the oxides to molecular nitrogen. Oxidation is accomplished by contacting the gases with oxidant in the presence of suitable catalysts. The catalysts are usually placed in the exhaust line leading from the combustion zone and serve to promote reaction between these oxidants and uncombusted and partially combusted fuel components. These oxidants are typically derived from either operation of the combustion zone in which case it will be inherently present in the exhaust gas or from an external air or other oxygen supply. Combined with the oxidation catalyst in a single bed is a catalyst material that will selectively promote the reduction of nitrogen oxides to nitrogen. Catalyst systems combined on a single bed which simultaneously promote oxidation and reduction reactions to reduce the hydrocarbon, carbon monoxide and $NO_X$ content of exhaust gases are known to the art as three-way catalysts (TWC).

It has been determined that platinum group metal compounds deposited on an alumina support provide an especially effective TWC. In practice, the catalyst systems are normally supported on relatively inert high surface area materials, usually of a refractory metal oxide, typically gamma alumina, so that the catalyst metals can be highly dispersed to obtain large active surfaces. The term, gamma alumina, is used herein in accordance with the common parlance in the catalyst industry to include high surface area admixtures, typically over 60 m²/g, preferably over 80 m²/g, consisting essentially of the gamma and delta phases of alumina but also possibly including substantial amounts of the eta, kappa and theta phases.

A common deficinecy associated with supported catalyst systems is the thermal degradation of the catalyst support from extended exposure to the high exhaust gas temperatures of power producing systems. In a moving vehicle for example, the exhaust temperatures can reach 1,000° C., and such elevated temperatures cause the support material to undergo a phase transition with accompanying volume shrinkage, especially in the presence of steam, whereby themetal catalyst becomes occluded in the shrunken support medium with a loss of exposed catalyst surface area and a corresponding decrease in activity.

A further deficiency with the TWC systems above described is the adverse effect on catalyst activity caused by the use, in automobiles of high air/fuel (A/F) ratios which cause the oxygen concentration in the exhaust gases to be greater than stoichiometric. To achieve optimal simultaneous redox reactions with conventional TWC systems requires the A/F to be in the vicinity of stoichiometric. The use of high A/F ratios in automobile engines improves the fuel economy of the engine, but the presence of excess oxygen in the exhaust, referred to in the art as a "lean exhaust," reduces the activity of platinum group metal catalysts, which are common components of TWC.

To achieve optimal simultaneous redox reactions in the exhaust using conventional catalysts, the A/F ratio must be in the vicinity of the stoichiometric A/F since the immediate vicinity of the stoichiometric A/F forms the TWC "Window" where the catalyst efficiency is high for the conversion of all three pollutants, i.e. hydrocarbon, carbon monoxide and $NO_X$.

The art has devised various methods to improve the catalyst efficiency of platinum metal based TWC systems and widen the TWC window. For example, U.S. Pat. No. 3,993,572 and U.S. Pat. No. 4,157,316 teach improving the catalyst efficiency of Pt/Rh based TWC systems by incorporating a variety of metal oxides, e.g. rare earth metal oxides such as ceria and a base metal oxide such as nickel oxide in the TWC system. Thus, in an article entitled "Three Way Catalyst Response To Transients" (Ind. Eng. Chem. Prod., Res. Dev. 1980, 19, 288-293) the authors, Schlatter, et al. report that the operating environment of three-way catalysts is characterized by oscillations of the feed stream composition which occur with a frequency in the order of 1 Hz. The incorporation of an "oxygen storage" component in the catalyst moderates the effects of the rapid changes between rich and lean exhaust stoichiometries. In a later article, published in the same journal, entitled "Ceria-Promoted Three-Way Catalysts for Auto Emission Control" (Ind. Eng. Chem. Prod. Res. Dev. 1982, 21, 274-288) the author, Kim, reports that ceria ($CeO_2$) is the best non-noble metal oxide promotor for a typical alumina supported Pt-Pd-Rh TWC, largely because it enhances the water-gas shift reaction ($CO + H_2O = CO_2 + H_2$) and possibly due, in part to the additional oxygen storage it provides to the TWC.

It is further known to the art ("Oxygen Storage Capacity of CeO₂ Containing Catalysts" Y. F. Yu Yao, J. Catal. 86, p. 254 (1984) that TWC catalysts prepared using components wherein platinum group metals are deposited on $CeO_2$ particles, such composite particles can promote the redox reaction of the $CeO_2$ to increase the storage capacity of this oxide.

The art, of course continues to seek means to improve the catalyst efficiency of platinum group metal based TWC systems.

SUMMARY OF THE INVENTION

The present inventors have found that the efficiency of three-way catalysts containing platinum and ceria can be improved if a p-type metal oxide is present in intimate contact with ceria. It is thought that the p-type metal oxide has a tendency to oxidize to a higher oxidation state when it is in intimate contact with ceria, resulting in enhanced promotion of oxidation reactions by the combined oxides.

Composite catalyst particles prepared by depositing platinum on p-type oxide coated ceria particles show substantially improved efficiency, especially when compared to platinum coated ceria composite particles in which the p-type metal oxide is absent.

In accordance with the present invention, there is provided a more efficient three-way catalyst system suitable for simultaneously oxidizing hydrocarbons and carbon monoxide and reducing nitrogen oxides in the exhaust gases of power vehicles and, in particular, for internal combustion engines, which catalyst system contains a high surface area alumina, ceria and a p-type metal oxide, at least one of the catalyst components being a composite comprised of the p-type metal oxide in intimate contact with the ceria.

In the catalyst system of the present invention, the catalyst is comprised of platinum, a high surface area support material such as gamma alumina and ceria having deposited thereon a p-type metal oxide.

Optionally, the composite p-type metal oxide/cerium oxide catalyst component may be further coated with platinum and/or palladium, or admixed with particles such as gamma alumina bearing dispersed platinum. Particles of these types are combined to form a catalytic composition which may then be deposited on a monolithic substrate or other carrier to form the catalyst.

As will hereinafter be demonstrated, by incorporating p-type metal oxide/cerium oxide composite particles in a TWC, there is obtained a catalyst composition exhibiting a substantial increase in catalyst efficiency after extensive lean exhaust exposure as represented by the conversion of the hydrocarbon, carbon monoxide and nitrogen oxides to innocuous gases.

DETAILED DESCRIPTION OF THE INVENTION

A p-type metal oxide may be conveniently defined as a metal oxide exhibiting increasing electroconductivity as the pressure of oxygen in equilibrium therewith is increased. P-type metal oxides are generally oxides of metals of the first transition metal series, e.g. cobalt (II), nickel (II), iron (II), manganese (II and III), cromium (II and III), and the like, see for example, p. 13 *Catalysis by Nonmetals*, O. V. Krylov, Academic Press, New York, 1970. Nickel oxide is a typical p-type oxide for use in the practice of the present invention.

The ceria upon which the p-type metal oxides are deposited in accordance with the present invention need not be pure ceria, but may be mixed with the oxides of lanthanum, neodymium and praseodynium. Commercially available mixtures of rare earth oxides may also be used if they contain substantial amounts of ceria. If a mixture of rare earth metal oxides is used, the mixture is usually one in which cerium oxide is the predominant component.

It is advantageous to include a substantial portion of ceria as colloidal ceria, particle size 20 Å, such that a large geometric $CeO_2$ surface area to promote oxidation and reduction reactions can be obtained. However, in a rhodium containing TWC catalyst, it is desirable to include a substantial portion of ceria as bulk ceria segregated from the rhodium to avoid adverse interference between the ceria and rhodium, i.e. strong rhodium-ceria support interaction. Similarly, if the p-type oxide is applied to alimina prior to deposition of ceria on the alumina, the strong interaction between the p-type oxide and the alumina prevents the ceria and p-type oxide from being in the required intimate contact. Similarly, p-type oxide in the bulk form, rather than promoting the catalytic activity of ceria, interferes with it so the presence of p-type oxide in the bulk form should be avoided.

Such interference can be avoided by using a washcoat containing at least two types of particles: rare earth oxide free particles with the rhodium and possibly other platinum group metal dispersed thereon and ceria containing particles which are substantially rhodium free. A washcoat made by mixing these two classes of particles may be applied to a monolith using known techniques.

Catalysts of the present invention are manufactured and supplied as catalytically coated rigid skeletal monoliths, or honeycomb elements where there are a multiplicity of longitudinal passageways or cells in each unit in order to provide a large nominal surface area.

The rigid monolithic, honeycomb structures are typically made from "ceramics" which comprise refractory crystalline materials such as sillimanite, magnesium silicates, zircon, petalite, spodumene, cordierite, aluminosilicates, mullite, or combinations thereof, etc. Such materials, which are of varying compositions of silica, magnesia and alumina are considered to have macro porosity; however, because their surfaces are not highly porous, the catalyst metal compounds are impregnated on high surface area alumina and then coated onto the monolithic structure.

The presence in the TWC of p-type metal oxide/cerium oxide composite particles and platinum forms the critical feature of the present invention. Thus, in preparing the catalyst materials of the present invention, a metal compound which decomposes on calcination in an appropriate atmosphere to a p-type metal oxide is deposited on the surface of cerium oxide particles. In the case of iron, calcination should normally be conducted in an inert atmosphere or a vacuum as the n-type oxide $Fe_2O_3$ is normally formed upon calcination in air. Calcination in air normally is satisfactory for the other metals. Optionally, the platinum may be deposited on the composite particles or impregnated on separate support particles, e.g. gamma alumina, or the composite particles may be fixed on the alumina. Thus, in preparing platinum containing catalyst components in accordance with the practice of the present invention, the platinum component may be a platinum/p-type oxide/ceria composite, a p-oxide/ceria composite in combination with platinum supported on ceria or alumina, or any of the individual platinum containing composites supported on alumina.

In preparing platinum based TWC systems in accordance with the practice of the present invention in which rhodium is a catalyst metal, the rhodium component should not be deposited on rare earth oxide or in combination therewith on an alumina support as this practice has previously been found to deleteriously impair catalyst efficiency. Advantageously, in preparing the TWC the rhodium catalyst component is supported on alumina particles which are substantially free of rare earth oxides.

The various supported catalyst particles of the present invention are combined in a liquid medium such as water to provide a slurry which may be applied to a monolithic substrate as a "washcoat" by any conventional means such as by immersing the monolith in the washcoat. Thereafter, the washcoated monolith is drained of excess slurry, blown with air to remove excess slurry and then calcined to drive therefrom the liquid medium of the slurry and to leave onthe monolith a dry, adherent coating comprised of platinum group metal, p-type metal oxide/cerium oxide composite and platinum/p-type metal oxide/cerium oxide composite bearing alimina particles.

The preparation of the composite p-type metal oxide/cerium oxide composite component of the present invention may be accomplished by first preparing an aqueous solution of a soluble salt of the metal which can be converted to an oxide at the elevated temperatures used for drying and calcining in an appropriate atmosphere, such salts including nitrate, actate, formate, carbonate or other organic or inorganic water soluble salts. The cerium oxide powder can then be impregnated with the aqueous solution of soluble p-type oxide precursor containing just enough water to completely saturate the powder. Thereafter, the powder is dried and calcined to prepare the p-oxide/cerium oxide composite or the p-type oxide precursor is fixed on the cerium oxide. Alternatively, the p-type oxide/cerium oxide composite may be prepared by co-precipitating p-type oxide and ceria from a solution containing both the p-type oxide precursor and a cerium containing species. The precipitate then can be dried and calcined in an appropriate atmosphere to form the composite. The resulting composite material can then be mixed, if desired, with a platinum containing component such as stabilized alumina impregnated with platinum or the platinum may be applied to the p-oxide/ceria composite directly, for example, by impregnating the composite with a platinum containing solution, and the composite may be treated to fix the platinum group metals on the composite. Water soluble compounds or complexes, as well as organic soluble compounds or complexes or platinum and optionally also palladium, may be used. The only limitation on the liquids to deposit these compounds, complexes, or elemental dispersions is that the liquids should not unduly react with the mtal compound and should be capable of being conveniently removed from the catalyst such as by volatilization or decomposition by subsequent heating and/or vacuum. Suitable compounds are, for example, chloroplatinic acid, potassium platinum chloride, ammonium platinum thiocyanate, amine solubilized platinum hydroxide, palladium nitrate and palladium chloride and similar species. The platinum or palladium metal component/p-type metal oxide/cerium oxide composite can be admixed with aluminum support particles and comminuted, i.e. reduced in size, as by ball milling. These alumina dispersed particles can then be formed into a washcoat which is then applied to a monolithic carrier and calcined at temperatures typically about 125° C.–500° C. to yield the three-way catalyst.

The catalyst support materials used in the practice of this invention as already discussed generally contain forms of higher surface area alumina. The higher surface area aluminas include gamma, eta, kappa, theta and delta phases, preferably having surface areas over 80 $m^2/g$, as distinguished from the relatively lower surface area alpha phase of alumina.

In catalysts of this invention, the amount of cerium oxide which may be present in the catalyst washcoat compositions of the present invention may vary from about 1 to about 50 percent by weight and preferably about 5 to about 30 percent by weight. The amount of p-type metal oxide deposited on bulk cerium oxide particles may vary from about 0.05 to about 20 percent by weight and preferably about 0.1 to about 10 percent by weight based on the total combined weight of the cerium oxide and p-type oxide.

In catalysts of this invention, wherein rhodium is a catalyst component, the combined weight of platinum and palladium present may advantageously be in excess of twice the weight of rhodium. Preferably, the combined weight of platinum and palladium is at least four times that of rhodium. In the more preferred embodiments, the combined weight of the platinum and palladium exceeds that of rhodium by a factor of at least about 5. Generally, the amount of catalyst metal used is a minor portion of the TWC system and typically does not exceed about 10 percent by weight of the alumina support material exclusive of the substrate. The amount of catalyst may be from about 0.01 to 8% by weight and is preferably about 0.05 to 5% by weight of the alumina to economically maintain good activity with prolonged use. For use in automobile exhaust converters, the catalyst will generally be comprised of about 0.25 $g/in^3$ to about 4.0 $g/in^3$ alumina, preferably about 0.5 $g/in^3$ to about 3.0 $g/in^3$ alumina, about 0.5 $g/ft^3$ to about 150 $g/ft^3$ of platinum, preferably about 5 $g/ft^3$ to about 110 $g/ft^3$ of platinum, about 0.5 to about 700 $g/ft^3$ p-type metal oxide, preferably abut 1.5 to about 140 $g/ft^3$ p-type metal oxide and about 0.01 to about 2 $g/in^3$ cerium oxide and preferably about 0.05 to about 0.8 $g/in^3$ of the cerium oxide.

If desired, a stabilizer such as silicon dioxide, zirconia, or an alkaline earth oxide may be admixed or combined with the alumina support material. The presence of these stabilizers retards the phase transition of higher surface area alumina to alpha alumina thereby reducing loss of catalytic activity. The amount of alkaline earth oxide stabilizer combined with the alumina is about 0.05 to 30 percent by weight, preferably about 0.1 to 25 percent by weight, based on the catalyst. Among the alkaline earth oxides which may be used to stabilize alumina are those barium, strontium, calcium and magnesium, barium oxide being preferred.

The present invention is illustrated by the examples which follow:

EXAMPLE I

A. Preparation of P-Type Metal Oxide Modified Ceria Supported Platinum Particles Two hundred and twenty (220) grams of cerium oxide powder (high purity 99.9% as $CeO_2$), having a surface area of 130 m²/g, was impregnated with an amine solubilized platinum hydroxide (H₂Pt(OH)₆) solution. After drying and calcining, a ceria supported platinum powder with 0.5 weight percent platinum metal loading was obtained. In a series of runs individual 30 gram samples of the ceria supported platinum powder were further impregnated with a variety of aqueous base metal nitrate solutions, e.g. nickel nitrate, cobalt nitrate, iron (II) nitrate, manganese nitrate and chromium (III) nitrate. After drying and calcining, various p-type oxide modified platinized ceria composite powders containing 0.3 weight percent base metal, i.e. Ni, Co, Fe, Mn and Cr respectively, were obtained. In the case of iron, calcination was conducted in nitrogen to ensure that the p-type oxide, FeO, was formed rather than the n-type oxide, Fe₂O₃, which typically would have been formed after prolonged heating in air.

B. Preparation of TWC Catalyst System Using P-Type Metal Oxide Modified Ceria Supported Platinum Particles Catalyst A Thirty (30) grams of the nickel oxide modified platinized ceria powder prepared above and 50.2 grams of gamma alumina powder (stabilized with 0.8 weight percent barium oxide) having a surface area of 130 m²/g were combined and the admixture further ball milled with water and acetic acid to prepare a slurry. A 1½″ diameter and 3″ in length 400 cell/in² cordierite monolithic carrier was then dipped into the ball milled slurry to coat it to a coating solid weight of 1.547 g/in³. Excess slurry was blown off by compressed air, the monolith was dried at 125° C. to remove water and then calcined at 400° C. to yield a finished catalyst having 5 g/ft³ loading of platinum on the monolith.

Catalyst B

The procedure used to prepare Catalyst A was repeated with the exception that the 0.3 weight percent cobalt oxide modified platinized ceria prepared above was substituted for the nickel oxide modified platinized ceria.

Catalyst C

The procedure used to prepare Catalyst A was repeated, except that the 0.3 weight percent iron oxide modified platinized ceria prepared above was substituted for the nickel oxide modified platinized ceria, and the calcination was conducted in nitrogen.

Catalyst D

The procedure used to prepare Catalyst A was repeated with the exception that the 0.3 weight percent manganese oxide modified platinized ceria prepared above was substituted for the nickel oxide modified platinized ceria.

Catalyst E

The procedure used to prepare Catalyst A was repeated except that the 0.3 weight percent chromium oxide modified platinized ceria prepared above was substituted for the nickel oxide modified platinized ceria.

For purposes of comparison, the procedure used to prepare Catalyst A was repeated, except that 0.5 weight percent platinum supported on ceria which had not been modified with a p-type metal oxide was combined with alumina to prepare the TWC containing monolithic catalyst. This comparative catalyst was designated "Catalyst C₁".

For purposes of further comparison, the procedure used to prepare Catalyst A was repeated, except that 0.5 weight percent platinum supported on gamma alumina (stabilized with 0.8 weight percent barium oxide, surface area 130 m²/g) was substituted for the nickel oxide modified platinized ceria. This second comparative catalyst was designated "Catalyst C₂."

Each of the monolithic catalysts prepared in Example I, as well as the comparative Catalysts C₁ and C₂ prepared above, was mounted in the exhaust system of a laboratory test engine and aged 4 hours using an accelerated aging fuel containing 0.012 gPb/gal wherein the air-to-fuel ratio was maintained at stoichiometric for 92% of the time with a catalyst inlet temperature of about 610° C. and at 0.3 A/F units lean of stoichiometric A/F for 8% of the aging period with an inlet temperature of about 780° C. After aging, the TWC catalysts were evaluated on an engine dynamometer wherein the air-to-fuel ratio employed was fluctuated ±1.0 A/F units at 1.0 Hz perturbations. The evaluations were at an inlet temperature of 400° C. and an exhaust gas flow rate of 80,000 VHSV. The catalystic efficiencies at the above-described conditions are summarized in Table I.

TABLE I

CONVERSION EFFICIENCIES OF CATALYSTS A–E AND COMPARATIVE CATALYSTS AT VARIOUS A/F AFTER FOUR HOURS ENGINE AGING

| TWC CAT-A-LYST | A/F = 14.55 | | | 14.65 | | | 14.75 | | |
|---|---|---|---|---|---|---|---|---|---|
| | HC | CO | NO$_x$ | HC | CO | NO$_x$ | HC | CO | NO$_x$ |
| | | | | Percent Conversion | | | | | |
| A | 84 | 62 | 43 | 89 | 75 | 44 | 91 | 84 | 43 |
| B | 84 | 61 | 43 | 89 | 74 | 46 | 91 | 85 | 46 |
| C | 75 | 54 | 36 | 82 | 66 | 37 | 85 | 74 | 35 |
| D | 75 | 53 | 37 | 82 | 67 | 38 | 85 | 78 | 38 |
| E | 80 | 58 | 43 | 85 | 71 | 44 | 87 | 82 | 41 |
| C₁ | 73 | 50 | 35 | 80 | 63 | 35 | 83 | 69 | 34 |
| C₂ | 71 | 46 | 35 | 76 | 53 | 35 | 79 | 59 | 34 |

By reference to the data in Table I, it is immediately apparent that the platinum supported on p-type oxide modified ceria catalysts prepared in accordance with the present invention (Catalysts A–E) exhibit better overall performance than that of the platinum supported on non-modified ceria (Catalyst C₁) and substantially superior to that of the platinum supported on alumina particles (Catalyst C₂).

EXAMPLE II

A series of platinum containing TWC catalysts were prepared as follows:

Catalyst H

Nine hundred fifty (950) grams cerium powder (95% purity), having a surface area of 130 m²/g, was impregnated with an aqueous nickel nitrate solution containing 50 grams NiO. After drying and calcining at 450° C. for 2 hours, a 5 percent by weight nickel oxide modified ceria powder was obtained.

Seventy six and seven tenths (76.7) grams of the nickel oxide modified ceria power was impregnated with an amine solubilized platinum hydroxide (H₂Pt(OH)₆) solution containing 0.74 grams platinum. The wet platinum-ceria-nickel oxide bearing powder was mixed with 153.4 grams gamma alumina powder (stabilized with 0.8 weight percent barium oxide, having a surface area of 130 m$^2$/g) and then ball milled with water and acetic acid to produce a slurry. A 1½" in diameter and 3" in length 400 cell/in$^2$ cordierite monolithic carrier was dipped into the ball milled slurry to coat it to a loading of 1.8 g/in$^3$. Excess slurry was blown off by compressed air, and the monolith was dried at 125° C. to remove water and then calcined at 400° C. to yield a finished catalyst having 10 g/ft$^3$ loading of platinum on the monolith.

Catalyst I

The procedure used to prepare Catalyst H was repeated, except that the platinum catalyst component was not applied to the ceria nickel oxide composite but instead was applied to 76.7 grams of barium stabilized gamma alumina powder. The ceria nickel oxide composite, the platinum bearing alumina and 76.7 additional grams of barium stabilized gamma alumina were mixed and ball milled to form the washcoat.

For purposes of comparison the procedure of Example II to prepare Catalyst H was repeated with the exception that the cerium oxide powder was not modified with nickel oxide. This comparative TWC catalyst was designated "Catalyst C$_3$."

For purposes of further comparison, the procedure used to prepare Catalyst H was repeated except that 5 weight percent nickel, as NiO, separated from the ceria surface but physically mixed therewith was substituted for the nickel oxide modified ceria powder. This comparative TWC catalyst was designated "Catalyst C$_4$."

For purposes of still further comparison, the procedure used to prepare Catalyst I was repeated, except that gamma alumina (stabilized with 0.8 weight percent barium oxide, having a surface area of 130 m$^2$/g, was substituted for the nickel oxide/ceria composite particles. This comparative TWC catalyst was designated "Catalyst C$_5$."

Each of the catalyst monolith bodies prepared above, after having been thermally aged in a muffle furnace at 750° C. for 70 hours in air, was mounted in the simulated exhaust stream of a laboratory test reactor, the exhaust gas containing 0.24% CO, 0.08% H$_2$, 0.27% O$_2$, 300 ppm C$_3$H$_6$, 500 ppm NO$_x$, 10% CO$_2$, 10% H$_2$O, the balance being N$_2$. The temperature of the exhaust gas was 400° C., the flow rate of the exhaust gas was 50,000 VHSV, and the air-to-fuel ratio employed was fluctuated ±0.5 A/F units at 1.0 Hz perturbations. The efficiencies of the various catalysts prepared above at the above-described conditions are summarized in Table II.

TABLE II
CONVERSION EFFICIENCY OF CATALYSTS H-I AND COMPARATIVE CATALYSTS AT STOICHIOMETRIC A/F AFTER 70 HOURS THERMAL AGING AT 750° C. IN AIR

| TWC CATALYST | Percent Conversion | | |
|---|---|---|---|
| | HC | CO | NO$_x$ |
| H | 93 | 80 | 64 |
| I | 86 | 80 | 53 |
| C$_3$ | 73 | 67 | 38 |
| C$_4$ | 64 | 67 | 28 |
| C$_5$ | 1 | 4 | 0 |

By reference to Table II, it is immediately apparent that the presence of a p-type oxide (i.e., NiO) modified ceria composite of this invention either as a support for platinum or a component in the washcoat in combination with a platinum catalyst provides superior catalyst performance (Catalysts H and I).

By way of contrast, if the p-type oxide (i.e., NiO) is not in intimate contact with the ceria, its inclusion does not provide any improvement in efficiency especially when compared to a TWC catalyst in which ceria is a component (compare catalyst C$_3$ with C$_4$) and such catalysts are substantially inferior both to the catalysts of the present invention and to catalysts containing ceria but no p-type oxide.

By way of further contrast, the extensive thermal treatment in air of an alumina supported platinum TWC catalyst in which NiO modified ceria is absent results in a total deactivation of the catalyst (Catalyst C$_5$).

EXAMPLE III

Various platinum-rhodium containing TWC systems were prepared in accordance with the present invention as follows:

Catalyst J

One kilogram of gamma alumina powder (stabilized with 0.8% by weight of barium oxide), having a surface area of 130 m$^2$/g, was impregnated with an amine solubilized aqueous platinum hydroxide (H$_2$Pt(OH)$_6$) solution containing 4.82 grams of platinum. The particle size of the platinum containing alumina was reduced by ball milling with water and acetic acid to form a slurry.

In a separate operation, 300 grams of gamma alumina (surface area 130 m$^2$/g) stabilized with 0.8% by weight barium oxide was ball milled with water and acetic acid to form a slurry. The slurry was impregnated with an aqueous rhodium chloride solution containing 1.93 grams of rhodium metal. The rhodium was fixed with hydrogen sulfide at room temperature, the resulting rhodium having an average particle size of 35 to 40 Å diameter as determined by CO chemisorption.

In a separate operation, 500 grams of the nickel oxide coated bulk ceria powder prepared in Example II (Catalyst H) was impregnated with an amine solubilized aqueous platinum hydroxide (H$_2$Pt(OH)$_6$) containing 4.84 grams of platinum. The wet powder was then ball milled to form a slurry and then mixed with the platinum/alumina slurry and the rhodium containing slurry to form a washcoat slurry. A monolithic support of cordierite containing about 400 flow passages per square inch of cross-section was dipped into the washcoat slurry. The excess was blown off the monolith by compressed air, and the monolith was dried to remove free water and calcined at 500° C. for 20 minutes to provide a 20 g/ft$^3$ platinum group metal loading on the monolith with a 5:1 Pt/Rh ratio of platinum to rhodium.

Catalyst K

The procedure of the Catalyst J was repeatd with the exception that the platinum group metal loading on the monolith was 20 g/ft$^3$ with a 19:1 ratio of platinum to rhodium.

Catalyst C$_7$

For purposes of contrast, a comparative TWC catalyst was prepared by substantially following the procedures disclosed in U.S. Pat. No. 3,993,572 and U.S. Pat. No. 4,157,316. Thus, a ceria stabilized alumina support containing 5% by weight ceria was impregnated with solutions of platinum and rhodium salts to co-deposit the metals on the support. After fixation of metal, the impregnated support was ball milled to form a washcoat slurry containing bulk nickel oxide as the oxygen storage component, and the slurry was applied to a 400 cell cordierite monolith. The resultant catalyst contained 16.67 g/ft$^3$ of platinum and 3.33 g/ft$^3$ of rhodium. The ceria stabilized alumina was present in an amount of 1.5 g/in$^3$ and nickel oxide in an amount of 0.3 g/in$^3$ on the catalyst.

Cores of 1¼" in diameter and 3" in length were removed from each of the catalyst monoliths.

In a first series of tests, each of the monolith cores, after having been aged at 900° C. for 8 hours in an atmosphere composed of 90% $N_2$ and 10% steam and then aged an additional 24 hours at 800° C. in air, was mounted in the simulated exhaust stream of a laboratory test reactor. The temperature of the exhaust gas was 400° C., the flow rate of the exhaust gas was 50,000 VHSV and the air-to-fuel ratio employed was fluctuated ±0.5 A/F units at 0.5 Hz and 1.0 Hz perturbations. The efficiencies of the various catalysts at the above described conditions are summarized in Table III below.

TABLE III

CONVERSION EFFICIENCIES OF AGED Pt/Rh CATALYST MONOLITHS FIRST SERIES

| TWC CATA- | 1.0 Hz | | | 0.5 Hz | | |
|---|---|---|---|---|---|---|
| LYSTS | HC($C_3H_6$) | CO | $NO_x$ | HC($C_3H_6$) | CO | $NO_x$ |
| Catalyst J | 99 | 74 | 85 | 88 | 58 | 73 |
| Catalyst K | 90 | 64 | 76 | 80 | 51 | 69 |
| Catalyst $C_7$ | 73 | 64 | 66 | 63 | 47 | 57 |

The data recorded in Table III clearly indicate the superior conversion efficiencies after combined hydro thermal and high temperature air aging of the TWC prepared in accordance with the present invention (Catalysts J and K) as compared with a conventional TWC catalyst (Catalyst $C_7$) prepared in a manner outside the scope of the present invention.

In a second series of tests, monolith cores corresponding to Catalysts J, K and $C_7$ as described above, were aged in a muffle furnace in the presence of air at 800° C. for 70 hours, then mounted in a simulated exhaust stream of the laboratory test reactor of the type employed in the example above. The temperature of the exhaust gas was 400° C., the flow rate of the exhaust gas was 50,000 VHSV and the air-to-fuel ratio employed was fluctuated ±0.5 A/F units at 0.5 Hz perturbations. The efficiencies of the aged monoliths are summarized in Table IV below.

TABLE IV

CONVERSION EFFICIENCIES OF AGED Pt/Rh CATALYST MONOLITHS SECOND SERIES

| TWC | 1.0 Hz | | | 0.5 Hz | | |
|---|---|---|---|---|---|---|
| CATALYSTS | HC | CO | $NO_x$ | HC | CO | $NO_x$ |
| Catalyst J | 97 | 83 | 80 | 86 | 60 | 71 |
| Catalyst K | 94 | 80 | 77 | 83 | 58 | 64 |
| Catalyst $C_7$ | 2 | 16 | 6 | 2 | 12 | 4 |

The data recorded in Table IV show that extensive air exposure (70 hours) at 800° C. results in substantially total deactivation of a conventional TWC catalyst (Catalyst $C_7$), but Catalyst J and K prepared in accordance with the present invention still retain high conversion efficiencies. It is particularly significant that an improved TWC with a substantial reduction of rhodium content (Catalyst K) can be achieved in accordance with the present invention.

While specific components of the present system are defined above, many other variables may be introduced which may in any way affect, enhance, or otherwise improve the system of the present invention. These are intended to be included herein.

Although variations are shown in the present application, many modifications and ramifications will occur to those skilled in the art upon a reading of the present disclosure. These too are intended to be included herein.

We claim:

1. An improved catalyst active at least for oxidation of hydrocarbons and carbon monoxide in a gas stream, said catalyst being of the type having, dispersed on a refractory support, platinum, particles of ceria and high surface area alumina, wherein the improvement comprises: a p-type metal oxide being dispersed on said particles of ceria.

2. The catalyst of claim 1 wherein the amount of cerium oxide ranges from about 5 to about 30 percent by weight of the catalyst, exclusive of substrate material.

3. The catalyst of claim 1 wherein the p-type metal oxide ranges from about 0.1 to about 10 percent by combined weight of the cerium oxide/p-type metal oxide.

4. The catalyst of claim 1 wherein platinum is dispersed on the p-type metal oxide bearing cerium oxide particles.

5. The catalyst of claim 1 wherein the p-type metal oxide coated ceria particles are dispersed on alumina particles.

6. The catalyst of claim 1 wherein the cerium oxide is present with other rare earth oxides.

7. The catalyst of claim 1 wherein the cerium oxide is colloidal ceria.

8. The catalyst of claim 1 wherein the p-type metal oxide is nickel oxide (NiO).

9. The catalyst of claim 1 wherein the p-type metal oxide is a cobalt chosen from the grup consisting of CoO, $Co_3O_4$ and mixtures thereof.

10. The catalyst of claim 1 wherein the p-type metal oxide is an iron oxide chosen from the group consisting of FeO, $Fe_3O_4$ and mixtures thereof.

11. The catalyst of claim 1 wherein the p-type metal oxide is a manganese oxide chosen from the group consisting of MnO, $Mn_2O_3$ and mixtures thereof.

12. The catalyst of claim 1 wherein the p-type metal oxide is a chromium oxide chosen from the group consisting of CrO, $Cr_2O_3$ and mixtures thereof.

13. The catalyst of claim 8 wherein the platinum bearing particles defined are dispersed on particles of gamma alumina.

14. The catalyst of claim 1 wherein the catalyst further comprises palladium dispersed on said high surface area alumina.

15. The catalyst of claim 1 wherein the platinum is incorporated therein at a concentration of about 5 g/ft$^3$.

16. the catalyst of claim 1 further comprising particles of substantially rare earth oxide free alumina having rhodium dispersed thereon.

17. The catalyst active at least for reduction of oxides of nitrogen in a gas stream, said catalyst being of the type having ceria particles and platinum dispersed on a refractory oxide support, wherein the improvement comprises: a p-type metal oxide being dispersed on said ceria particles.

* * * * *